Aug. 18, 1936.  W. D. FOSTER  2,051,787
FILM HANDLING APPARATUS
Filed Jan. 15, 1934  4 Sheets-Sheet 1

INVENTOR
BY William Duncan Foster
ATTORNEY

Aug. 18, 1936.  W. D. FOSTER  2,051,787
FILM HANDLING APPARATUS
Filed Jan. 15, 1934  4 Sheets-Sheet 2
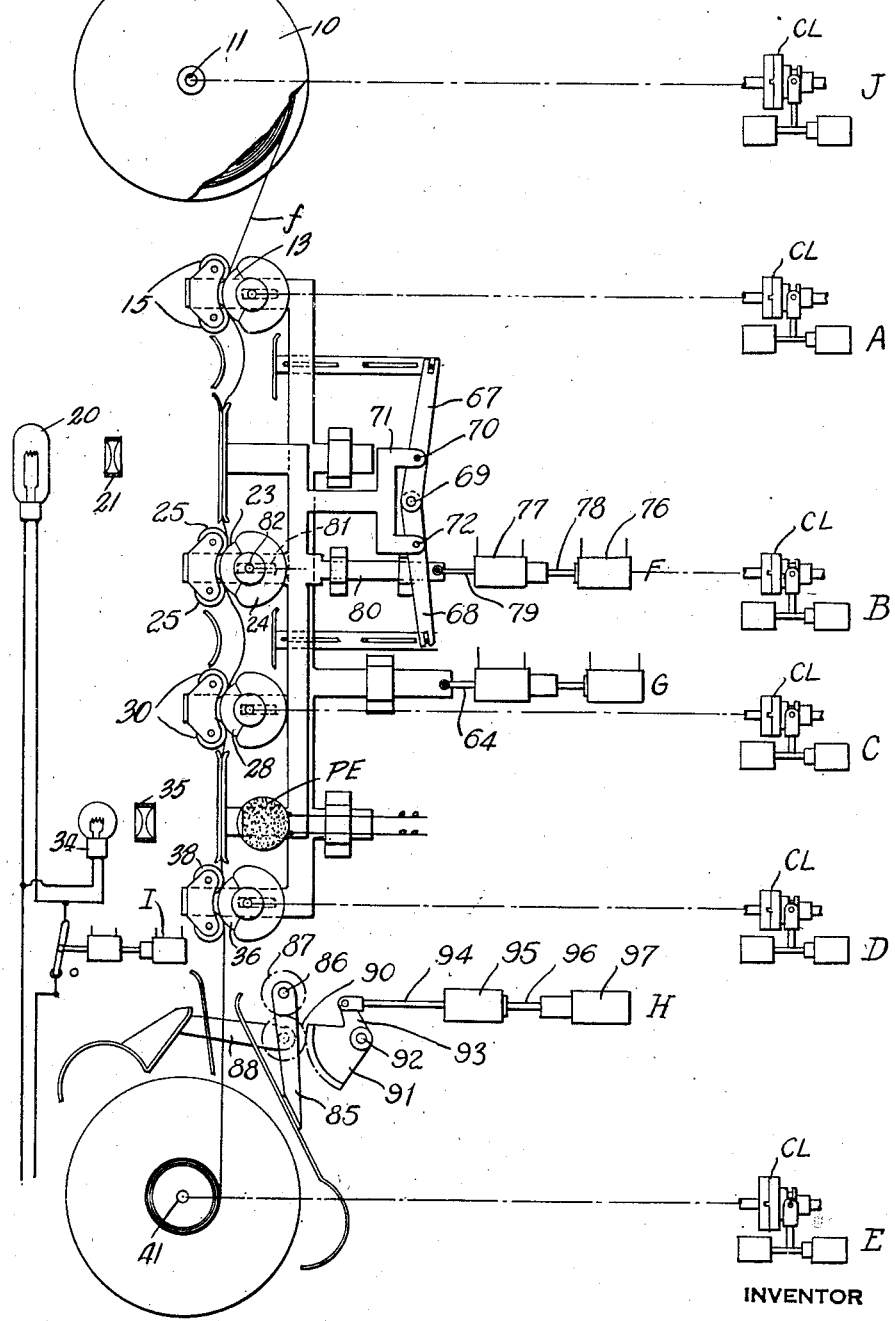

Aug. 18, 1936.  W. D. FOSTER  2,051,787
FILM HANDLING APPARATUS
Filed Jan. 15, 1934   4 Sheets-Sheet 3
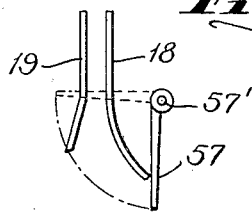
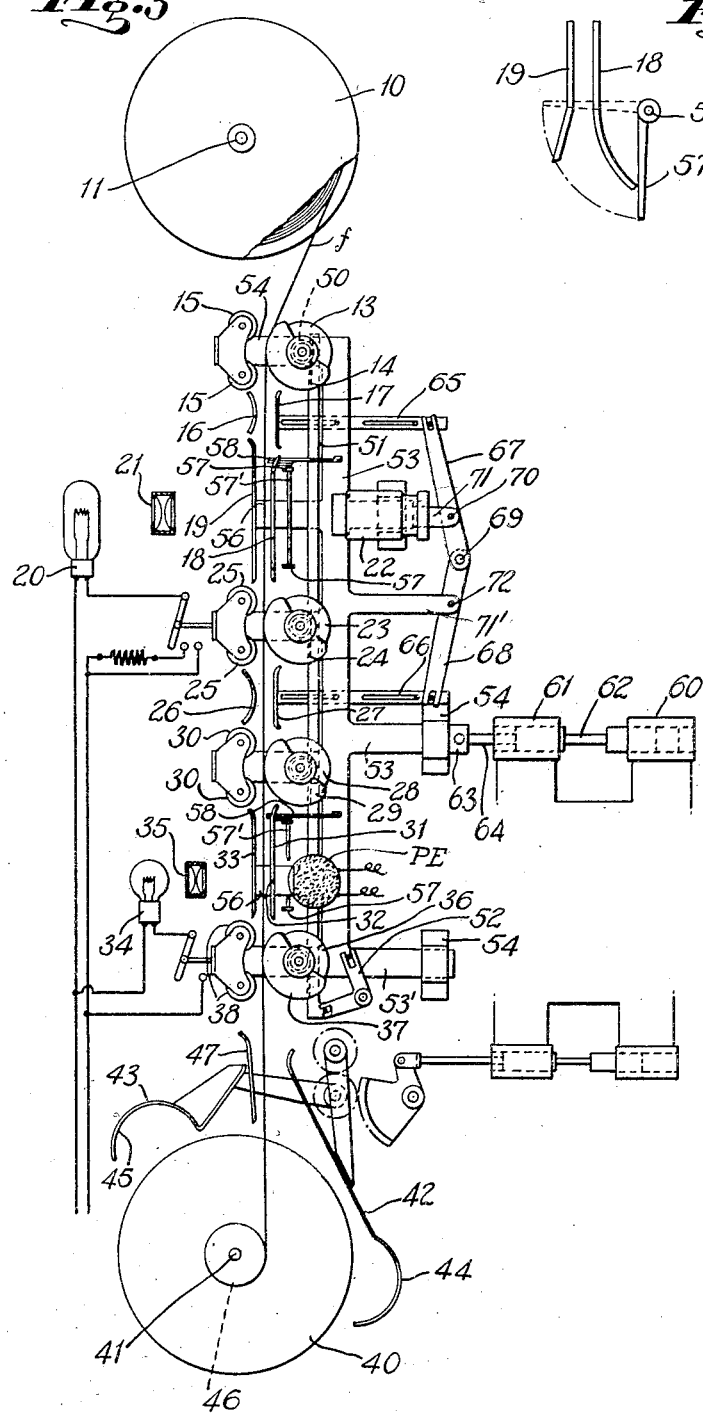
INVENTOR
BY *Warren Dunbar Foster*
ATTORNEY

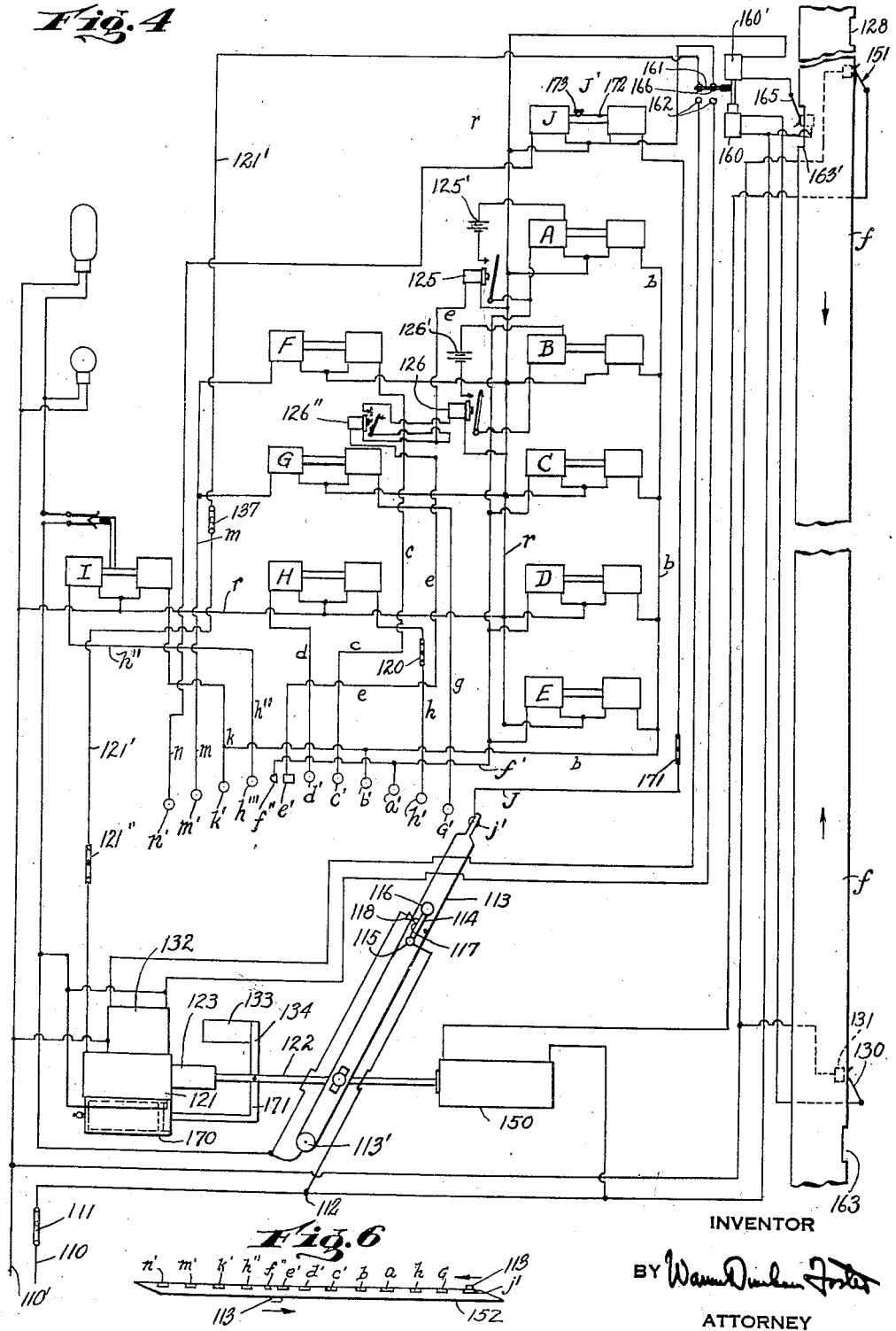

Patented Aug. 18, 1936

2,051,787

UNITED STATES PATENT OFFICE 2,051,787

FILM HANDLING APPARATUS

Warren Dunham Foster, Washington Township, Bergen County, N. J., assignor to Kinatome Patents Corporation, Ridgewood, N. J., a corporation of New York Application January 15, 1934, Serial No. 706,765

35 Claims. (Cl. 88—16.2)

The present invention relates generally to the apparatus for handling strip material and more particularly to motion picture apparatus in which a film bearing pictorial images or a film bearing such images and images representing sound are projected or exposed or printed.

The present application is a continuation in part of my co-pending application Serial Number 57,392 filed September 18, 1925, now Patent Number 1,943,303. Some of the subject matter of the present invention is disclosed in the co-pending application of the late Earle L. Parmelee and myself, Serial Number 105,159 filed April 28, 1926, now Patent Number 1,944,024.

An important object of this invention is to provide a control mechanism for a film handling apparatus such film handling apparatus being fully automatic in that it automatically threads and rewinds a film repetitiously, or being partially automatic in that it automatically performs whatever part of such complete operation may be desired, such control mechanism being improved and simplified over that shown in the said co-pending applications.

Another one of the objects of the present invention is to provide an improved machine for the automatic threading and projection and rewinding of film bearing pictorial images and images representing sound, such film to be fed by apparatus making use of conventional loops of unsupported slack.

Another object of my invention is to provide a film handling apparatus having a plurality of operable parts arranged each with its own operating means which can be so actuated by the film as to secure great flexibility of operation of the entire apparatus.

Another object of the present invention is to provide a film handling apparatus having a plurality of operable parts some of which are interconnected for operation by mechanism common to the connected parts, the remaining operable parts of the apparatus each being arranged with a separate mechanism for operating it in a desired sequence relative to the other operable parts.

A further object of the present invention is to provide an improved electric switching mechanism controlled by a plurality of solenoids each having a different operative movement of its core from that of the other solenoids so that a switch member may be moved by one of the solenoids to a predetermined point for controlling certain operable parts of the apparatus, and a predetermined period thereafter the switch member may be moved by another of the solenoids an additional distance for controlling other of the operable parts of the apparatus.

In Patents 1,943,303 and 1,944,024, I provide highly developed mechanical control mechanism, electrically operated and either electrically actuated by the film or actuated by light passed through signalling or other markings upon the film, for operating in the desired relation the various operable parts of the apparatus.

Another object of the present invention is to provide a plurality of inter-connected electrical control units, each to control one part or group of parts, the operative interconnection between these control units being electrical.

Another object of my invention is to provide improved means for controlling the operation of film propelling means, film feeding means, means for spacing the film and the teeth of a feeding member, film gates and presser members, a projection lamp, an exciter lamp, a sound head, loop forming means, film winding means, film rewinding means, a take-up guide, and in short each and all of the operable parts of a motion picture apparatus, either concomitantly or individually, in desired sequences or otherwise.

Another object is to make use of the opposed and selective solenoid system of my parent application filed September 18, 1925, now Patent Number 1,943,303, dated January 16, 1934, and applications divisional therefrom Serial Number 697,089, filed November 7, 1933, and Serial Number 596,884, filed March 4, 1932, which upon January 16, 1934, matured as Patent Number 1,944,026, respectively, but to apply said system, not to one unified control mechanism as in the parent case but to individual parts or groups of parts with a unified electrical control of the several solenoids, this control in turn being carried out, if desired, by circuits which are operated by opposed solenoids.

Another object is to provide a novel combination of manual and electrical or automatic control, each properly safeguarded against the other.

Another object of this invention is to combine the control mechanism herein described with the operable parts and other structure of the copending applications to which reference is made herein.

Other objects, advantages and characteristics will be evident from the following portion of this specification, the accompanying drawings, and the subjoined claims. Although I am showing one preferred form only of my invention for purposes of illustration, it will be understood that changes can readily be made without departing from the spirit of my invention or the scope of my broader claims.

Figure 2 is a diagrammatic view of the structure of Figure 1 disposed for automatic loop forming operations. In this view, certain electro-magnetic controlled clutches of the apparatus are shown, each opposite the operable film moving means which it controls.

Figure 3 is a diagrammatic view of the structure of Figure 1 disposed for rewinding the film.

Figure 4 is a wiring diagram illustrating how the structure of the apparatus can be controlled by the film for automatic operation.

Figure 5 is a detail plan view of film positioning fingers shown in Figure 3 diagrammatically.

Figure 6 is a diagrammatic view illustrating a preferred means for returning a control switch to starting position without affecting any associated controlled parts.

Figure 1:
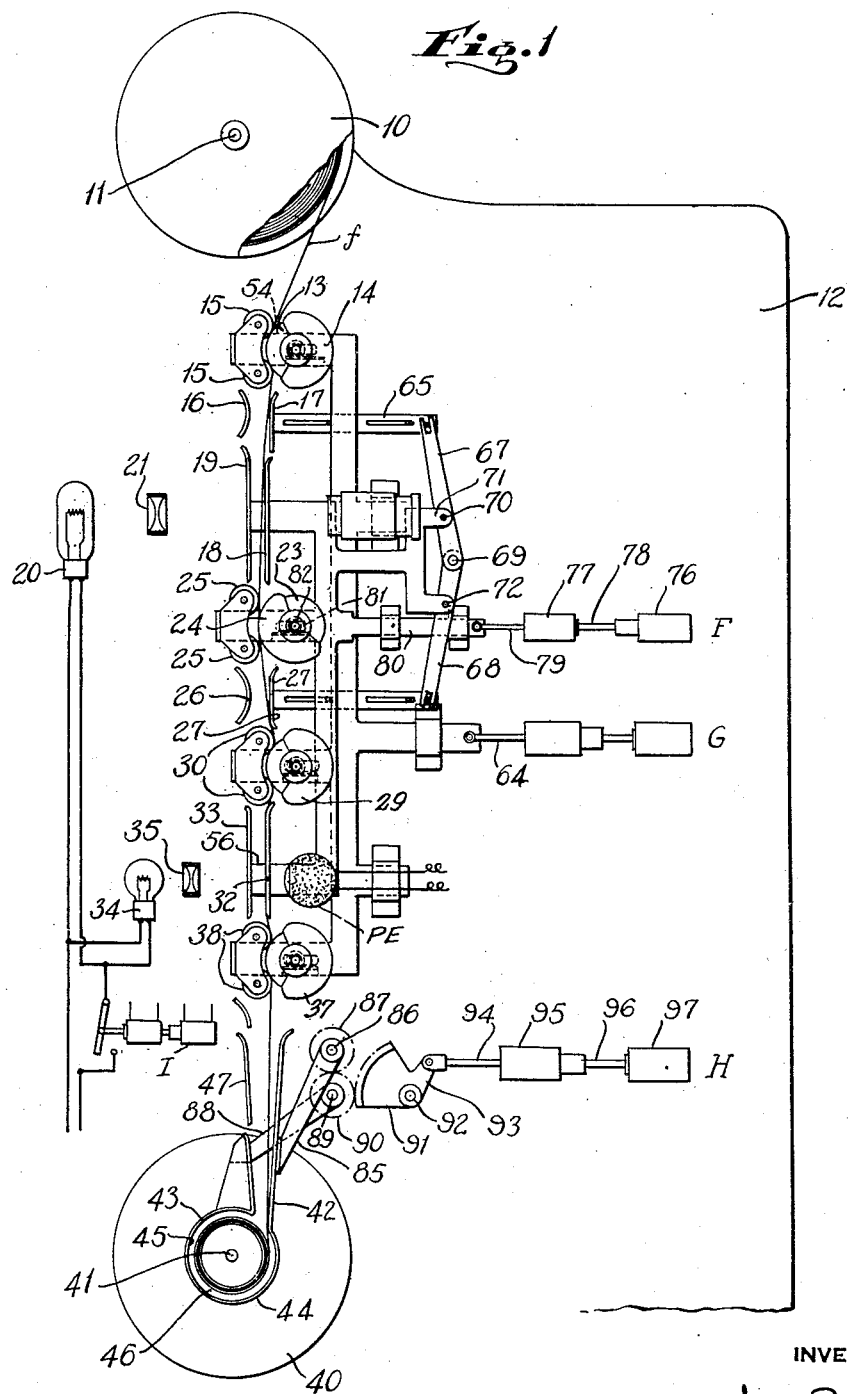
Figure 1 is a diagrammatic view illustrating a film handling apparatus embodying my invention disposed in condition for carrying out the power threading operation.

In the following description of how my invention may be carried out it will be understood that the drawings illustrating certain forms of my invention are merely diagrammatic. It will be understood further that the majority of the operable film engaging parts referred to in the description may be of well known construction unless otherwise noted and therefore I do not deem it necessary to describe any desired construction of such parts. It can be readily seen by those skilled in the art that different forms of standard film engaging parts such as sprockets, gate sections, and other well known elements of film handling apparatus may be used in carrying out my invention, as shown, for example, in my parent application.

According to one embodiment of my invention, a delivery carrier 10, shown as an ordinary reel, may be mounted on a spindle 11 supported in any suitable way as on an upright frame member 12. Adjacent the carrier 10, a supply sprocket 13 may be mounted in any suitable way and have a suitable stripping and protective member 14 mounted coaxially therewith. For cooperation with the sprocket 13, presser members 15 may be mounted in a way presently to appear. Below the sprocket 13 there are shown two film guiding members 16 and 17 which are sometimes referred to hereinafter as loop guides and will be mounted for operation in a way presently to appear. Below the loop guides 16 and 17, a gate is shown which may include a relatively fixed section 18 and a relatively movable section 19. Means for moving the section 19 for opening and closing the gate will be disclosed hereinafter. For cooperation with the gate, I may employ an electric lamp 20 of a well known kind, and between the lamp and the gate there is disposed a condensing lens 21 for cooperation with the lamp, the usual aperture of the gate, and an objective lens 22 on the opposite side of the gate.

An intermittent feeding sprocket 23 having a protective and stripper member 24 coaxial therewith may be mounted below the gate in the usual way, and presser members 25 may be mounted for cooperation with the sprocket 23 in a way presently to be described. Below the intermittent sprocket 23 may be mounted loop guides 26 and 27. A take-up sprocket 28 and a coaxial protective and stripping member 29 are mounted in a usual way below the intermittent sprocket 23, and presser members 30 are provided for cooperation with the sprocket 28.

A sound head including a photo-electric cell PE, which may be of well known construction, is provided and preferably mounted a suitable distance below the intermittent sprocket 23. For cooperation with the photo-electric cell there is provided a gate which may include a relatively fixed member 31 having a usual aperture 32 and a relatively movable section 33. Means for opening and closing the gate sections 31 and 33 will be described hereinafter. For cooperation with the aperture 32 and the photo-electric cell PE, there is provided an exciter lamp 34 which may be of usual construction, and a lens 35. For moving the film past the cell PE there is provided a sprocket 36 and a coaxial stripping and protecting member 37 and presser members 38.

The sprockets 13, 23, 28 and 36 with their respective strippers 14, 24, 29 and 37 may be constructed as shown in my co-pending application Serial Number 347,959, filed March 18, 1929, likewise a continuation of my parent application, and in the co-pending applications of myself and Frederick Davenport Sweet Serial Number 345,716, filed March 9, 1929, which upon April 9, 1935, matured as Patent Number 1,996,759, and 352,525 filed April 4, 1929, which upon March 12, 1935, matured as Patent Number 1,993,735, respectively. A suitable distance below the sprocket 36 a take-up carrier, which may be in the form of usual reel 40, may be mounted on a driven spindle 41 in a well known way. The spindle 41 may be driven through a clutch by means such as that disclosed in the said Patent Number 1,993,735 of Frederick Davenport Sweet and myself dated March 12, 1935. The carrier, i. e., reel 10 may also be driven for rewinding purposes as taught in any of said co-pending applications.

To secure power or automatic threading of the apparatus disclosed in Figure 2, I show take-up film guiding members 42 and 43 having curved portions 44 and 45 respectively. These curved portions are arranged for cooperation with a core 46 of the reel 40 when the film guiding members are moved to threading position by means presently to be disclosed. For cooperation with the film guiding member 43 there may be mounted in a suitable way in the apparatus a fixed film guiding member 47. The construction of the film guiding members 42 and 43 may be substantially as shown in the second above noted copending application of myself and Frederick Davenport Sweet. If desired, spring members of well known construction may be applied thereon on the film guiding portion adjacent the hub of the carrier to assist in the guiding of the propelled end of the film to and about the hub.

For operating the above noted film moving and film guiding members of the apparatus and for controlling the lamps employed in operating the apparatus the following means are used and may be operated either through manual control or automatically through film control or partly by manual control and partly by film control. For operating the protective members 14, 29, and 37 which are preferably operated simultaneously the following means may be used. Each of these protective members may have a coaxial gear 50 secured to it as taught in said Foster and Sweet application and fully shown in Figures 4, 4a, 36 and 41 thereof. Each of these gears is arranged for engagement with a rack bar 51 which extends from a point adjacent the sprocket 13 downwardly to a point adjacent the sprocket 36 (see Figure 3). The lower end of this rack member is operatively connected by a pin and slot connection to an arm of a bell crank 52. The other arm of the bell crank is fastened by a pin and slot connection to a laterally movable operating slide 53 which may be suitably mounted on the frame 12 for right and left operative movements by straps 54 engaging integral arms 53' of the shield. Each pair of the presser members 15, 30 and 38 is mounted on a leftwardly extending arm 55, each of which arms may be integrally joined to the slide 53. The movable gate sections 19 and 33 are each mounted on a leftwardly extending arm 56 integrally joined to the slide.

Means for moving a film laterally for accurately positioning it in the film track between the gate sections 18, 19, 32 and 33 may be provided and include film sweeping fingers 57 mounted on a vertical shaft 57' which may be operatively connected with the slide 53 through a suitable lever system 58. These fingers 57 will preferably operate as taught in the copending application of Barton A. Proctor, Serial Number 348,633, filed March 20, 1929, now Patent Number 1,944,037.

If desired, switch control means for the lamps 20 and 34 may be connected to the slide 53 as shown in Figure 3.

For operatively moving the slide leftwardly and rightwardly I prefer to employ a solenoid device including two oppositely acting solenoids 60 and 61, the cores of which are connected by a bar member 62 which may be integral with the cores if desired as taught in my parent application. An integral arm member 53' of the slide 53 is connected to the core of the adjacent solenoid 61 by a rod. Thus it can be seen that the slide 53 can be operatively moved either to the right or to the left by the energization of the proper solenoid, 60 or 61.

The loop guides 17 and 27 may be operatively moved by the following described means. The guide 17 is carried by a slidable member 65 and the guide 27 is carried by a slidable member 66. As shown in Figure 3 the right ends of each of these slidable members 65 and 66 are connected by a pin-and-slot device to two levers 67 and 68, respectively, which are pivotally connected by a fixed screw 69. The lever 67 is pivotally mounted at 70 on a pivot carried by a rightwardly extending bracket member 71 integrally joined with the slide 53. The arm 68 is pivotally mounted at 72 on a bracket 71'. It can be seen by inspection of Figures 2 and 3 that rightward movement of the slide 53 is effective for moving the loop guiding members 17 and 27 rightwardly a sufficient distance to permit formation of loops of unsupported slack below the sprockets 13, and 23. It can thus be seen from the structure described hereinabove that initial operative rightward sliding movement of the slide 53 is effective first to rotate the strippers counter-clockwise and leave all of the three sprockets 13, 28 and 36 accessible to the film. Further rightward movement of the slide brings the presser members 15, 30 and 38 into operative relation with the associated sprockets and presses the film into engagement with the sprockets.

For operating the protective member 24 and the presser members 25 associated with the intermittent sprocket 23 the following described mechanism may be employed. A solenoid device including two oppositely opposed solenoids 76 and 77, the cores of which may be connected by an integral bar 78, may be mounted opposite the intermittent sprocket 23 and connected thereto by a rod 79 fastened to the core of the solenoid 77. The left end of the rod 79 is pivotally fastened to a slidably mounted member 80 which extends leftwardly to a point past the sprocket 23 and carries on its leftward end the presser members 25. The slidable member 80 is provided with a lengthwise slot 81 in which may be cut rack teeth for engaging with the teeth of a pinion 82 mounted on the axle of the sprocket 23. The pinion 82 may be joined in a well known way to the protective member 24 and movement to the right of the slide 80 upon the energizing of the solenoid 86 will be effective for revolving the protective member 24 in a counter-clockwise manner, and moving the presser members 25 into engagement with the sprocket 23.

For operating the take up guides 42 and 43, the guide 42 may be carried by arm 85 pivoted on a stub shaft 86 on which is secured a gear 87. The guide 43 is mounted on a member 88 which is pivoted on a stub shaft 89 on which is secured a gear 90 arranged for engagement with the gear 87 as shown in Figure 2. For moving the guides 42 and 43 the following mechanism may be employed. A gear sector 91 may be pivoted at 92 and have an arm 93 pivotally connected by a rod 94 to the core of a solenoid 95. The core of the solenoid 95 may be connected by the rod 96 to the core of a solenoid 97 which is wound to act oppositely to the solenoid 95. It can thus be seen by inspection of Figure 2 that upon the energizing of the solenoid 95 the sector 91 will be operated to move the members 85 and 88 angularly so as to open the take up guide and upon the energizing of the solenoid 97 the members 85 and 88 are moved so as to render the take up guide operative.

In Figure 2 there is illustrated a plurality of pairs of oppositely acting solenoids for operating clutches associated with film advancing means, each clutch being operated by its own individual solenoid. These solenoids are numbered A, B, C, D and E. Other pairs of solenoids are shown in this view which are designated respectively F, G, H, I and J. The functions of solenoids F, G, and H have been described hereinbefore. The function of the pair of solenoids I is indicated diagrammatically in Figure 4 to operate a switch for controlling the usual projecting lamp 20 and the exciter lamp 34 in a predetermined manner. The solenoids J, A, B, C, D, and E are arranged for controlling clutches herein designated as CL, which clutches control, respectively, the delivery reel 10, the feeding sprocket 13, the intermittent sprocket 23, the continuously operating taking up sprocket 28, the continuously operating sprocket 36 which feeds film past the sound head and the take-up spindle 41. For operating each pair of these solenoids at predetermined times first in one direction for connecting the associated driven member with driving means which may be suitably connected with an electric motor of usual construction (not shown) and in the other direction for disconnecting the same driven parts from the driving means connected with the motor.

For controlling the above named pairs of solenoids for the purposes of threading a film through the apparatus by power, and for forming loops and for film feeding purposes during projection, and for rewinding purposes, a control system may be used such as is diagrammatically shown in Figure 4. For operating this control system a source of electricity (not shown) may be connected through means including conductors 110 and 110'. The conductor 110 may pass through a usual hand operated switch 111 for stopping the operation of the entire apparatus at will. The source of power is connected to the various solenoids at predetermined times through circuits, one side or branch of which leads from the conductor 110 at 112 and passes through a master lever switch 113 pivoted at 113'. An auxiliary switching device includes a switch blade 114 pivotally mounted on a pin 115 on the switch 113 and insulated therefrom. At the other end of the switch blade 114 is supported a finger piece 116 for manually moving the switch 113. As shown in Figure 4 the switch blade 114 carries a contact 117 which engages a cooperating contact 118 which is also carried by the switch 113 and electrically connected thereto. When the switch 113 is moved leftwardly by the finger piece 116 the contacts 117 and 118 are closed and the above named electric source of power is then connected through the switch 113 to such desired parts as will appear hereinafter. The switch blade 113 for direct control purposes is only intended to be moved operatively to the left. Should an operator accidentally or willfully move the switch blade 113 to the right after it is once started toward the left the contacts 117 and 118 will instantly open and the entire apparatus will be rendered inoperative as will appear hereinafter. Also the rightward movement of switch 113 will be instantly effective to extinguish the lamps as can be seen by inspecting the circuit of the lamps which must pass through the contacts 117 and 118.

In beginning the operation of a film handling apparatus embodying my invention for securing power threading of the film through the apparatus the switch 113 will preferably be positioned at the contact button h' (see Figure 4) and the circuit h completed through the switch 113 and the right hand solenoid of the solenoid pair H. It will be noted that in this circuit a hand switch 120 is positioned for manually controlling the circuit h. The closing of the switch 111 may energize the solenoid 121 which is connected to the switch lever 113 by means of a cross bar 122 which is fastened to the core 123 of the solenoid 121 and is connected to the switch 113 by a pin and slot connection. Therefore the switch 113 is moved leftwardly by the energizing of the solenoid 121. Upon movement of the switch 113 to the button a' all of the sprockets except the intermittent sprocket are connected to the driving means by the above mentioned clutches. That is to say, the movement of the switch 113 to the point a closes circuits through all of the solenoids associated with all of the sprockets except the intermittent. The leading end of the film is then inserted in a usual way between the presser members 15 and the feeding sprocket 13 and the film will be advanced through the film channel already formed which is as shown in Figure 1. The previous movements of the several parts to form the closed film channel will be explained hereinafter. Further movement of the switch 113 leftwardly will bring it to the button b' which is connected through the circuit b to the right hand solenoid of each of the pairs of solenoids A, B, C, D, and E which operate the clutches connected therewith to disengage all of the connected sprockets and the take-up spindle from the driving means. This stops the film feeding. Further movement of the switch 113 leftwardly brings it to the contact c' which is connected through the circuit c to the pair of solenoids F and operates the right hand solenoid of this pair which closes all the gates and removes the loop guides and operates the intermittent stripper to make the intermittent sprocket accessible by the film and finally operates the intermittent presser means to bring the film into engagement with the intermittent sprocket. Further movement of the switch 113 leftwardly brings it to the contact d' connected through the circuit d to the solenoids H and operates the left hand solenoid of this pair which opens the take-up guides. Further movement of the switch 113 leftwardly brings it to the contact e' which is connected through a circuit e to a time relay 125 which is effective to connect the left hand solenoid of the pair of solenoids A to a source of electricity 125' and is thus effective to connect the delivery feed sprocket 13 to the driving means. A predetermined period of time after the time relay 125 is closed a time relay 126 is energized which controls the circuit to the left hand solenoid of the pair of solenoids B, and the left hand solenoid thereof is thus energized and the intermittent sprocket 23 is connected to the driving means. To begin the operation of the intermittent sprocket 23 a predetermined time after the feed sprocket 13 begins for loop forming purposes, the left hand solenoid of the pair of solenoids B which connect the intermittent sprocket with the driving means for loop forming purposes is controlled by the following means. Such means include a slow acting relay 126" which is connected in the circuit e and which controls the circuit of the time relay 126. Thus when the current passes up through the circuit e the time relay 125 will be instantly energized and through the above described members energize the left hand solenoid of the solenoid pair A while the energization of the time relay 126 will be delayed until the feed sprocket has operated sufficiently to advance the film enough to form the upper loop. Then the relays 126" and 126 operate and the intermittent sprocket instantly is connected by operation of the left hand solenoid B to the driving means and begins to advance the film to form the lower loop. The feed sprocket continues operating so the upper loop is not lost. A very short advance of the switch 113 leftwardly after the loops are formed brings it to contact f" and all of the remaining sprockets are connected to the driving means because of the energization of their respective control solenoids by current through the circuit f' and the usual feeding movement begins.

The next and final portion of the movement of the switch 113 by the solenoid 121 moves the switch 113 to the contact h" which is connected through a circuit h" to the pair of solenoids I and is effective to operate the left hand solenoid of this pair and close the circuits to the main lamp 20 and exciter lamp 24. This places the apparatus completely in condition for a regular projecting operation. The switch 113 is finally stopped at a point slightly to the left of contact h".

The switch 113 ordinarily remains at the last point to which it is moved by the solenoid 121 during the projection of the film. The circuit of the solenoid 121 may now be opened, if desired, by switch means 121" which can be operated manually or by suitable connections (not shown) with the switch 113. After almost all of the film has been wound up on the take-up reel a control notch 128 on the right hand side of the film as shown in Figure 4 reaches a switch member 130 and lets the switch member drop inwardly against a contact 131 which actuates means described hereinafter to close the circuit of a solenoid 132 above the solenoid 121.

It will be understood by inspection of the drawings that when the switch 113 has been moved to the above mentioned point adjacent the contact 'h' the core 123 of the solenoid 121 will have moved leftwardly until the right end of the core is approximately even with the right end of the solenoid 121. It will further be seen that a core 133 for the solenoid 132 is mounted on a cross piece 134 fastened to the core connecting bar 122 and will thus move leftwardly with the core 123. At the time the core 123 has moved wholly into the solenoid 121 the core 133 will have moved up to and slightly within the solenoid 132 which upon being energized, as noted above, by means hereinafter described will pull the core 133 leftwardly and with it the connecting piece 122 and the switch 113. Initial leftward movement of the lever 113 by the solenoid 132 will bring it to the contact k' connected to circuit k which will be closed and made effective for operating the right hand member of the pair of solenoids I to turn off the lights and at the same time operate the right hand solenoid of each of the pairs of solenoids A, B, C, D and E to declutch all of the sprockets and declutch the take-up reel from the driving means. This brings the film movement to a stop temporarily.

Further movement of the switch 113 to the left brings it to the contact point m' which is connected through the circuit m to the left hand solenoids of the pairs F and G which is thus operated to open the gates and move the intermittent presser to open position, and also to operate the intermittent stripper to make the intermittent sprocket inaccessible by the film. The operation of the left hand member of the pair of solenoids G at the same time opens the presser members and operates the strippers of the continuously operating sprockets to make them inaccessible by the film. The operation of the left hand member of the pair of solenoids G also moves the loop guides into guiding position. If desired the apparatus can be left in this position ready for rewinding by opening a hand switch 137 in the circuit m. If it is desired to rewind at once, however, the solenoid 132 will move the switch 113 to its final leftward extent and make connection with the contact n' connected through the circuit n to the left hand member of the pair of solenoids and operate the same so as to clutch the rewinding spindle to the driving means and thus start the rewinding of the film.

When the switch 113 has reached the final leftward limit of its travel the circuit of the right hand solenoid 150 is closed through cooperation of a switch device 151 of similar construction and operation to the switch device made up of the parts 130 and 131, and a notch 163 in the right hand edge of the film which operates only the switch device 151. The solenoid 150 is a companion solenoid and acts oppositely to the solenoid 121 and therefore is effective to move the switch lever 113 to the right. The outer end of the switch lever is made of a resilient metal and when it reaches the leftward end of its travel this resilient portion of the lever is arranged to snap downward a small amount to be disposed below the commutator bar support 152 which is preferably made of electrically non-conducting material. It will be noted that the left end of the bar 152 (see Figure 6) is sloped to facilitate the movement of the lever 113 under it when being moved rightwardly by the solenoid 150. It will be understood that the bar 152 carries on its upper surface the contacts a', b', c', etc. When the lever 113 has been moved to the end of its rightward travel by the solenoid 150 it will be disposed in position adjacent an upwardly sloping end of the bar 152 so that upon the next leftward movement of the lever 113 by either manual operation or by the energizing of the solenoid 121 the switch 113 will again ride over the contacts a', b', c', etc.

It can be seen by inspection of Figure 4 that the circuit of the solenoid 132 may be closed by operation of an auxiliary pair of solenoids 160 which will be operated to move a switch bar 161 across a pair of terminal contacts 162 in the circuit of solenoid 132. For energizing the lowermost solenoid of the solenoid pair 160 and moving the cross bar 161 for energizing the solenoid 132, the control notch 128 may be positioned on the right hand side of the film to be adjacent the trailing end thereof which will become the leading end during rewinding. When the notch 128 passes the switch parts 130 and 131, the circuit to the solenoid 160 will be closed which will operate to close circuit to the solenoid 132 and energize the latter for moving the switch 113 to the left end of its travel.

As a notch 163' which, in practice, is positioned in the left hand edge of the film nearer the trailing end during rewinding than the notch 163 moves on toward the rewinding reel it engages with a switch member 165 and closes the circuit to the solenoid 160' which moves the cross bar 161 to a position across the terminals 166 and thus energizes the right hand solenoid of the solenoid pair J. When this is done the rewinding spindle is declutched and if desired the hand switch 171 can be operated to leave the apparatus in this condition, i. e., with the film rewound upon the delivery reel ready for reprojecting. At the same time the circuit to the right hand solenoid of the solenoid pair J is energized, the solenoid 121 is energized, as will be seen by inspection of Figure 4. The circuit 121' of the solenoid 121 being controlled by the switch member 161, the current for the solenoid 121 passes through the switch member 161 and back through the common return conductor r. Therefore, if it is desired to again project the lever 113 will begin moving leftwardly under control of the solenoid 121 and shortly after leaving the contact j' it engages the contact g' which is effective to close the circuit of the right hand solenoid of the solenoid pair G which operates through the above described means to retract all the shields except that of the intermittent and close all the presser means except that of the intermittent. Further movement of the switch 113 by the solenoid 121 brings it to the contact button h' which is effective to energize the right hand solenoid of the solenoid member H and thus operate the take up guide to move it into position adjacent the take up reel. This brings the master switch 113 back to the starting point where it is ordinarily positioned upon the beginning of power threading. Further movement of the switch by the solenoid 121 will operate as described hereinbefore. If it is desired to leave the apparatus in condition ready to begin reprojecting, the switch 120 in the circuit h may be opened by hand, and the switch 111 will also be opened.

It can be seen by those skilled in the art from the description hereinbefore that hand operated switches may be placed in each of the circuits if desired for stopping the master switch 113 at any point in its travel.

To control the speed of movement of the switch 113 as it moves leftwardly a dash pot 170 of usual construction may be disposed beneath solenoid 121, as viewed in Figure 4, and connected to the bar 122 by suitable connecting means 171 which may be made integral with the bar 134 which carries the solenoid core 133. Ordinarily the dash pot 170 will be operated by air in a usual way. If desired a well known type o of dash pot using a suitable fluid can be used to replace the dash pot 170. This will prevent moving the switch lever 113 too fast manually.

When one of the solenoids of a solenoid pair, for example, the pair J (see Figure 4) is energized the core of that solenoid is sucked into the solenoid in the usual way and a bar J which connects the two cores of the solenoids moves toward the energized solenoid. This will operate the associated clutch either to connect or to disconnect the driving means to the associated operable member. To assure that the cores of the solenoid and the connecting bar J, for example, remain in the position to which it was last moved two shallow detent notches 172 may be cut in the bars for cooperation with the detent spring 173 of well known construction. It can be readily seen by those skilled in the use of such detents that the detent spring may be relatively weak and that a slight pull on the bar J in either direction will release the detent means and allow the bar to be moved to its right or left operative position whereupon another notch will be engaged by the detent spring and the bar will be safely held in the last position to which it is moved.

It will be understood by reference to my copending application Serial Number 596,884 which matured on January 16, 1934 as United States Patent Number 1,944,026 that the arrangement of solenoids for moving the master switch 113 may be so arranged as to stop the switch indefinitely in several positions by simply adding a number of additional auxiliary solenoids such as the solenoid 132 and providing properly arranged cores for such auxiliary solenoids with proper connections between them and the bar 122. By such arrangements the master switch 113 may be moved to any desired position and left there indefinitely until the next auxiliary solenoid is energized under film control by notches placed at predetermined points on either side of the film. It will be understood by reference to the copending application Serial Number 105,159 which was issued on January 16, 1934 as United States Patent Number 1,944,024 that portions of a film having a translucency different from other portions of the film may be used in connection with light responsive means to control the several pairs of solenoids instead of notches in the film and the associated means described hereinbefore. It will be understood by those skilled in the art of solenoids that when the solenoid 121 is deenergized it will not be effective to prevent its core 123 moving leftwardly through it to any desired extent.

It can be seen by consideration of the disclosure hereinbefore that if desired each of the operable parts of the apparatus may be controlled by a separate individual pair of solenoids connected directly thereto in a suitable way to separately control each of the several operable parts instead of controlling several parts as is done with the pair of solenoids G and H. It will be understood that several separately controlled parts may be operated simultaneously when desirable.

It can also be seen by inspection of the copending applications which matured on January 16 and January 30, 1934, United States Patents 1,943,304 and 1,944,035 respectively that, if desired, suitable braking devices may be provided for each of the reel carrying spindles and be sequentially operated to slow down the movement of these reels at any desired time, for example, at the end of the rewinding operation when the solenoid pair J is operated to declutch the rewinding spindle from the driving means.

Certain of the advantages of my invention appear from the statements hereinbefore. Other advantages arise from the provision of sequential control means of great flexibility for sequentially controlling an apparatus having numerous parts to be operated sequentially for changing work conditions of the parts or for operating predeterminedly on a work piece in the apparatus.

It will be understood that while I have illustrated my invention in connection with an apparatus operating upon motion picture film it may be applied to various kinds of apparatus operating upon widely different kinds of work pieces.

I claim:

1. In a sound film handling apparatus, a first film support, a second film support, means for feeding the film intermittently for projecting pictures therefrom, a sound head, means for feeding film continuously past said sound head for reproducing sound therefrom, means for starting the operation of said intermittent feeding means, and separate means for starting the operation of said continuous feeding means, each of said starting means including a solenoid, a circuit for energizing each of said solenoids, and common control means operatively interconnecting each of said circuits for selectively energizing said solenoids.

2. In a sound film handling apparatus, a first film support, a second film support, means for feeding a film intermittently for projecting pictures therefrom, a sound head, means for feeding the film continuously past said sound head for reproducing sound, means for controlling said intermittent feeding means and said continuous feeding means, said controlling means including a solenoid associated with each of said feeding means, means for energizing said solenoids predeterminedly, means for taking up said film as it is fed past said sound head, and means for controlling said taking up means in accordance with the operation of said control means for said feeding means, said last named control means including a solenoid associated with said taking up means, and means for energizing said taking up solenoid predeterminedly in cooperation with said solenoids for said feeding means.

3. In a film handling apparatus for feeding a film bearing pictorial images and sound images, a first film support, an aperture, a light source for cooperation with said aperture for projecting pictures from said film, means for feeding said film intermittently past said aperture, a sound head, means for feeding said film continuously past said sound head for reproducing sound, said intermittent feeding means including a first continuous toothed feeding member, an intermittent toothed feeding member, and a second continuous toothed feeding member, means for automatically producing loops in said film between said first feeding member of said intermittent feeding member, and between said intermittent feeding member and said second continuous feeding member, said loop producing means including mechanism for operating all of said toothed feeding members predeterminedly, and a solenoid individual to each of said toothed feeding members for driving the operating means associated therewith for operating the same for loop forming purposes.

4. In a film handling apparatus for feeding a film bearing pictorial images and sound images, a first film support, an aperture, a light source for cooperation with said aperture for projecting pictures from said film, means for feeding said film intermittently past said aperture, a sound head, means for feeding said film continuously past said sound head for reproducing sound, said intermittent feeding means including a first continuous toothed feeding member, an intermittent toothed feeding member, and a second continuous toothed feeding member, means for automatically producing loops in said film between said first feeding member and said intermittent feeding member, and between said intermittent feeding member and said second continuous feeding member, said loop producing means including mechanism for operating all of said toothed feeding members predeterminedly, a solenoid individual to each of said toothed feeding members for driving the operating means associated therewith for operating the same for loop forming purposes, a second film support, means for revolving said second film support for taking up the film as it is fed past said sound head, and means for controlling the operation of said second film support in accordance with the operation of said loop producing means.

5. In a film handling apparatus, in combination, a plurality of driven film advancing members one of which is intermittently operated, film guiding means cooperating with said film advancing members to form a closed channel, a take-up carrier adjacent the other end of said channel, said film guiding means including a gate at which pictures may be projected from a film, said gate including a relatively fixed section and a relatively movable section, a gate for reproducing sound from the film, said last named gate including a relatively fixed section and a relatively movable section, said guiding means including guiding members disposed between said one of said film advancing members and said first named gate, said last named guiding members and said gate sections being mounted to be disposed in open film threading position, means for selectively and differentially operating said film advancing members for forming loops of slack film for cooperation with said intermittently operated film advancing member, and means controlled by a predetermined portion of the film for concomitantly moving said movable sections of said sound gate and of said picture gate into operative film feeding relation with the film and for moving said guiding members away from each other to permit the formation of loops between said picture gate and said sprocket.

6. In a film handling apparatus, in combination, a plurality of driven film advancing members one of which is intermittently operated, film guiding means cooperating with said film advancing members to form a closed channel, a take-up carrier adjacent the other end of said channel, said film guiding means including a gate at which pictures may be projected from a film, said gate including a relatively fixed section and a relatively movable section, a gate for reproducing sound from the film, said last named gate including a relatively fixed section and a relatively movable section, said guiding means including guiding members disposed between one of said film advancing members and said first named gate, said last named guiding members and said gate sections being mounted to be disposed in open film threading position, means for selectively and differentially operating said film advancing members for forming loops of slack film for cooperation with said intermittently operated film advancing member, and means controlled by a predetermined portion of the film for concomitantly moving said movable sections of both of said gates into operative film feeding relation with the film and for moving said guiding members away from each other to permit the formation of loops between said first mentioned gate and said sprocket, and said guiding means including a prime mover and connections between said prime mover and said gate section, connections between said prime mover and said guiding members for operatively moving the gate sections into close film feeding relation and for moving said guiding members to distant loop forming relation by one movement of said prime mover, and connections between said prime mover and said loop forming means for operating said loop forming means by said prime mover.

7. In a film handling apparatus, in combination, a delivery carrier, a source of light, means for moving a film past said source of light for projecting pictures, a sound head, means for moving the film continuously past said sound head for reproducing sound, a take-up carrier, devices including guides creating a closed channel between said continuously operating sprocket and the core of said taking up carrier, said guides including two cooperating members movable to a film threading position, and movable thereafter to an open film feeding position, and means for moving said guides between said open and closed positions, said means including a pivotal mounting for each of said guides, a connection between the pivotal mountings of said guides, a solenoid, and means for connecting said solenoid with said guiding members for moving them simultaneously between open and closed positions relative to said core of said carrier.

8. In a film handling apparatus, in combination, a delivery carrier, a source of light, means for moving a film past said source of light for projecting pictures, a sound head, means for moving the film continuously past said sound head for reproducing sound, a take-up carrier, devices creating a closed channel between said continuously operating sprocket and the core of said taking up carrier, said devices including guides including two cooperating members movable to a film threading position and movable thereafter to an open film feeding position, solenoids for moving said guides between said open and closed positions, means for rewinding the film, and means controlled by a predetermined portion of the film during a rewinding operation for operating said solenoids for operatively moving said film guides from open to closed position preliminary to a subsequent film threading operation.

9. In a film handling apparatus, in combination, a plurality of film advancing sprockets, film pressing means for each of said sprockets, means for rendering each of said sprockets inaccessible to the film, a common operating means for each of said means rendering the associated sprocket inaccessible by the film, and a common means operated by a predetermined portion of the film for moving each of said presser means to engagement with its associated sprockets, and a connection between said first named common operating means and said second named common operating means effective for rendering each of said sprockets accessible by the film before said presser means are moved to operative relation with said sprockets.

10. In a film handling apparatus, a first toothed feeding member, a second toothed feeding member, means for moving said first feeding member a predetermined amount for advancing the film and forming a loop between said first feeding member and said second feeding member, means for moving said second feeding member a predetermined amount less than the amount the film is moved by said first feeding member for advancing the film past said second feeding member for loop forming purposes, electrical timing means for accurately determining the extent of operation of each of said moving means whereby said loops are accurately formed, means for operatively disconnecting said first and second feeding means respectively from said means for moving said members, and means for driving both of said film feeding members in a feeding direction for carrying out the normal movement of the film.

11. In a film handling apparatus, in combination, a plurality of toothed film feeding means, driving means for all of said film feeding means for operating said feeding means in the same direction for advancing a film, means for connecting and disconnecting said film feeding means and said driving means, said connecting and disconnecting means including a separate clutch for each of said feeding members for connecting it to said driving means, a separate electro-magnetic device for moving each of said clutches, a circuit controlling each of said devices, and timing means for successively and predeterminedly closing each of said circuits whereby each of said clutches is successively and predeterminedly operated.

12. In a film handling apparatus, in combination, a plurality of toothed film feeding means, driving means for all of said film feeding means for operating all of said feeding means for advancing the film in the same direction, means for connecting and disconnecting said film feeding means and said driving means so that said film feeding means can be selectively operated, said connecting and disconnecting means including a separate clutch for each of said feeding members for connecting it to said driving means and a separate solenoid for operating each of said clutches, and control means for operating each of said solenoids predeterminedly, said control means including timing means for operating each of said solenoids in predetermined successive relation to the operation of the other thereof.

13. In a film handling apparatus, in combination, a plurality of toothed film feeding means, driving means for all of said film feeding means for operating all of said feeding means for advancing the film in the same direction, means for connecting and disconnecting said film feeding means and said driving means so that said film feeding means can be selectively operated, said connecting and disconnecting means including a separate clutch for each of said feeding members for connecting it to said driving means and a separate solenoid for operating each of said clutches, each of said solenoids including two oppositely acting windings and a common core extending between said windings, one of said windings being effective upon energization thereof for moving said core to render said clutch operative, the other of said windings being effective upon the energization thereof for moving said core to render said clutch inoperative, a circuit including each of said windings and timing means for successively closing each of said circuits whereby said clutches are operated in predetermined timed relation one to the other.

14. In a film handling apparatus, a delivery carrier, a take-up carrier, a plurality of toothed feeding members, one of which is intermittently operable, for feeding a film from said delivery carrier toward said take-up carrier, mechanism for selectively and differentially operating said toothed feeding members for creating at least one loop of slack film for cooperation with said intermittent feeding member, means for rewinding the film from said take-up carrier to said delivery carrier, and an actuating member operated by the film during the concluding portion of the rewinding operation for starting the operation of said loop forming mechanism in preparation for a subsequent projecting operation.

15. In a film handling apparatus, a delivery carrier, a take-up carrier, a plurality of toothed feeding members, one of which is intermittently operable, for feeding a film from said delivery carrier to said take-up carrier, means for rewinding the film from said take-up carrier to said delivery carrier, and mechanism for selectively and differentially operating said toothed feeding members preparatory to a feeding operation for creating at least one loop of slack film for cooperation with said intermittent feeding member, said mechanism including an actuating member movable from a first predetermined position to a second predetermined position for operating said loop forming mechanism, means for moving said actuating mechanism from said second back to said first position in readiness for a subsequent loop forming movement, and a member operated by the moving film during the rewinding thereof for actuating said moving means.

16. In a film handling apparatus, means for feeding a film therethrough, said film feeding means including an intermittent film advancing member and a continuously operating feeding member for cooperation therewith, means for selectively and differentially operating said intermittent and continuous feeding members for producing an unsupported loop of slack film for cooperation with said intermittent member, means for operating said loop producing means and means actuated by a signal upon the film for actuating said operating means, the film being provided with such a signal.

17. In a film handling apparatus, a spindle adapted for the removable mounting thereupon of a carrier having a core, operable means movable to guiding relation to said core for directing a film in relation thereto, control means for operating said guiding means, means for moving the film through said apparatus in a rewinding direction, and means responsive to a predetermined portion of the film during the rewinding operation for operating said control means for moving said guiding means to guiding position preparatory to the subsequent projecting operation.

18. In a film handling apparatus, a spindle adapted for the removable mounting thereupon of a carrier having a core, operable means movable to guiding relation to said core for guiding a film in relation thereto, control means for operating said guiding means for moving said guiding means into guiding relation with said core, means for rewinding the film, and means responsive to a signal upon the film for operating said control means during the rewinding operation whereby said guiding means are prepared for a subsequent projecting operation, the film being provided with such a signal.

19. In a film handling apparatus, a delivery carrier and a take-up carrier between which a film extends, an intermittently operated toothed feeding member, a toothed delivery member for drawing film from said delivery carrier and advancing it toward said intermittent member, a toothed take-up member for moving film away from said intermittent member and advancing it toward said take-up carrier, and an automatic loop forming mechanism, said mechanism including a separate electro-magnetic device, each including a circuit, associated with each of said toothed feeding members and effective for operating it to advance the film, switching means for closing each of said circuits, and timing means for governing said switching means and including devices for first closing only said circuit which operates said electro-magnetic device which operates said delivery toothed member thereby operating said member for advancing the film to form a loop between said delivery member and said intermittent member and devices for thereafter closing the circuit for said electro-magnetic device for operating said intermittent feeding member for a time less than that for which said delivery member has been operated and maintaining the circuit open which controls the operation of said take-up member thereby forming a loop between said intermittent member and said take-up member while not destroying the loop previously made between said delivery member and said intermittent member.

20. In a film handling apparatus, a delivery carrier and a take-up carrier between which a film extends, an intermittently operated toothed feeding member, a toothed delivery member for drawing film from said delivery carrier and advancing it toward said intermittent member, a toothed take-up member for moving film away from said intermittent member and advancing it toward said take-up carrier, and an automatic loop forming mechanism, said mechanism including a separate electro-magnetic device, each including a circuit, associated with each of said toothed feeding members and effective for operating it to advance the film, switching means for closing each of said circuits, and timing means for governing said switching means and including devices for first closing only said circuit which operates said electro-magnetic device which operates said delivery toothed member thereby operating said member for advancing the film to form a loop between said delivery member and said intermittent member, devices for thereafter closing the circuit for said electro-magnetic device for operating said intermittent feeding member for a time less than that for which said delivery member has been operated and maintaining the circuit open which controls the operation of said take-up member thereby forming a loop between said intermittent member and said take up member while not destroying the loop previously made between said delivery member and said intermittent member, and devices for thereafter maintaining all of said circuits closed for carrying out the regular projecting operation.

21. In a film handling apparatus, in combination, a plurality of toothed film moving means, driving means for each of said film moving means, means for connecting and disconnecting all of said film feeding means and said driving means, said connecting and disconnecting means including a clutch individual to each of said feeding means, electrical means including a circuit for operating each of said clutches, a switching element for successively closing each of said circuits whereby the clutch related thereto is rendered operative, and a solenoid device for moving said switching element into successive relation with each of said circuits.

22. In a film handling apparatus, in combination, a plurality of toothed film moving means, driving means for all of said film moving means, means for connecting and disconnecting all of said film feeding means and said driving means, said connecting and disconnecting means including a clutch individual to each of said feeding means, a solenoid device for operating said clutches, and control means for operating said clutches separately in predetermined relation to one another, said control means including a cam individual to each of said solenoids and a separate connection between each of said cams and its associated solenoid.

23. In a film handling apparatus, a plurality of toothed film advancing members including one which is intermittently operated and at least one which is continuously operated, a take-up spindle upon which a carrier with a hub may be mounted, threading means for automatically threading a film into operative relation with said toothed film advancing members and the hub of a carrier mounted upon said take-up spindle, means for selectively and differentially operating said film advancing members for automatically forming a loop of slack film for cooperation with said intermittent feeding member, and control mechanism operatively interconnecting said previously recited threading means and said previously recited loop forming means and including devices for first completing the operation of said previously recited threading means for automatically threading the film into operative relation with said toothed film advancing members and the hub of said carrier and thereafter operating said previously recited loop forming means for selectively and differentially operating said film advancing members for automatically creating a loop whereby the film is completely threaded into operative relation with all of said film advancing members and the hub of said take-up carrier before said loop is formed.

24. In a film handling apparatus, a plurality of film advancing members for feeding a film, a take-up spindle upon which a carrier may be mounted, operable guides for directing the propelled end of the film from said members to the hub of a carrier placed upon said take-up spindle, means for moving said guides between a guiding position and a position relatively distant to the film wherein the building up of the mass of a film about the hub of the carrier is unimpeded, means for propelling the film toward said hub, means for rewinding the film, and control mechanism for said means for moving said guides, said control mechanism including an actuating member operated by the film during the rewinding operation and timing means for interposing a predetermined interval between the actuation of said member and the movement of said guiding means to guiding relation so that said guides are moved to said guiding position after the rewinding operation and preparatory to a subsequent projecting operation.

25. In a film handling apparatus, in combination, a plurality of continuously operating film advancing sprockets, an intermittent sprocket, film pressing means for each of said sprockets, means operable for rendering each of said sprockets inaccessible by the film, means for operating each of said last named means associated with said continuously operating sprockets for making the same accessible by the film, means for maintaining said intermittent member inaccessible by the film, means for connecting said continuously operating sprockets to a source of power for advancing the film through said apparatus for film threading purposes, and means controlled by the film for operating said means for rendering said sprocket inaccessible by the film upon a predetermined movement of the film through the apparatus.

26. In a film handling apparatus, in combination, a first continuously operating film advancing sprocket, a plurality of continuously operating film advancing sprockets spaced along the film path, an intermittently operating sprocket for advancing the film for projection purposes, separate means associated with each of said continuously operating sprockets for rendering each of the same accessible or inaccessible by the film, means operable for rendering said intermittent sprocket accessible and inaccessible by the film, driving means for said sprocket, means operable for connecting said first continuously operating sprocket to said driving means, means operable for rendering said intermittent sprocket inaccessible by the film, taking up means for said film, said taking up means including a carrier formed with a hub, operable means for guiding said film in relation to said hub and actuated by a definitely predetermined portion of the film for removing said guiding means from guiding relation to said hub.

27. In a film handling apparatus for feeding a film bearing pictorial images and sound images, in combination, a plurality of continuously operating sprockets, an intermittent sprocket, film guiding means for forming a closed film channel past all of said sprockets and said sound head, said film guiding means including an apertured gate adjacent said intermittent sprocket and a gate bearing a slit adjacent said sound head, means for rewinding the film, means controlled by a signal upon the film, and operative concomitantly with the rewinding operation for moving said film guiding means to film threading position preparatory to a subsequent projecting operation, and means for moving said film guiding means to a film feeding position wherein said gates are closed and the remainder of said film guiding means are moved apart for loop forming purposes, the film being provided with a signal.

28. In a film handling apparatus for handling film bearing pictorial images and sound images, in combination, a delivery carrier, a first continuously operating gate, an apertured gate, an intermittent sprocket, a continuously operating take up sprocket, a sound head, a gate for defining a film path adjacent said sound head, a continuously operating sprocket for moving the film past said sound head, a taking up carrier, film guiding means between said last named sprocket and said taking up carrier, film guiding means between said first named sprocket and said first named gate, film guiding means between said intermittent sprocket and said continuously operating take up sprocket, means for rewinding the film, means controlled by the film and operative subsequently to the rewinding operation for operating said film guiding means and said gate for providing a closed channel and extending from said first named sprocket to said delivery carrier preparatory to a subsequent projecting operation, means for operating said film guiding means and said gate for feeding the film through said apparatus with loops of unsupported slack, and means controlled by the film for forming said loops of unsupported slack.

29. In a film handling apparatus, a plurality of toothed film feeding means, driving means for all of said film feeding means, means for connecting and disconnecting said film feeding means and said driving means, said connecting and disconnecting means including a separate clutch for each of said feeding members for separately connecting it to said driving means, a pair of oppositely acting solenoids for each of said clutches, each solenoid of each of said pairs being operatively connected with the other thereof, one of said solenoids being operative to move said clutch to effective position, and the other of said solenoids being operative to move said clutch to ineffective position, and latching means for releasably holding said clutch in the position wherein it was last moved by either of said solenoids.

30. In a film handling apparatus, a plurality of toothed film feeding means, driving means for all of said film feeding means, means for connecting and disconnecting said film feeding means and said driving means, said connecting and disconnecting means including a separate clutch for each of said feeding members for separately connecting it to said driving means, a pair of oppositely acting solenoids, each being operatively connected with its associated clutch, one of said solenoids being operative to move said clutch to effective position, and the other of said solenoids being operative to move said clutch to ineffective position, and latching means for holding said clutch in the position whereto it was last moved by either one of said solenoids, said latching means being releasable upon movement of said clutch by the other of said solenoids.

31. In a film handling apparatus, a plurality of toothed film feeding means, driving means for all of said film feeding means, means for connecting and disconnecting said film feeding means and said driving means, said connecting and disconnecting means including a separate clutch for each of said feeding members for separately connecting it to said driving means, a pair of oppositely acting solenoids for operating each of said clutches, each solenoid being operatively connected with its associated clutch, one of each pair of solenoids being operative to move its associated clutch to effective position and the other of the same pair of solenoids being operative to move its associated clutch to ineffective position, and means controlled by predetermined portions of the film for energizing either solenoid of any of said pairs of solenoids.

32. In a film handling apparatus, a plurality of toothed film feeding means, driving means for all of said film feeding means, means for connecting and disconnecting said film feeding means and said driving means, said connecting and disconnecting means including a separate clutch for each of said feeding members for separately connecting it to said driving means, a pair of oppositely acting solenoids for operating each of said clutches, each solenoid being operatively connected with its associated clutch, one of each pair of solenoids being operative to move said clutch to effective position and the other of the same pair of solenoids being operative to move said clutch to ineffective position, and means controlled by predetermined portions of the film for energizing either solenoid of any of said pairs of solenoids, said last named means including a master switch device for connecting said paired solenoids to a source of current, said switch device being movable under control of predetermined portions of the film to be brought into operative relation with any of said paired solenoids.

33. In a film handling apparatus, in combination, a revoluble delivery carrier, a revoluble take-up carrier, a continuously revoluble operable delivery sprocket, a plurality of film guiding members movable for forming a substantially continuous unimpeded film channel from said sprocket to said take-up carrier, and means for moving said guiding members to operative positions for forming said channel and thereafter moving said guiding members for destroying said channel, said moving means including a plurality of pairs of oppositely acting solenoids, a circuit for each of said solenoids and control means for energizing each solenoid of each of said pairs, said control means including means for controlling each of said circuits, and for timing means for selectively operating each of said circuit controlling means.

34. In a film handling apparatus, in combination, a revoluble delivery carrier, a revoluble take-up carrier, a continuously operable delivery sprocket, a plurality of film guiding members movable for forming a substantially continuous unimpeded channel from said sprocket to said take-up carrier, means for moving certain of said guiding members as a unit to operative positions for forming said channel and thereafter moving said guiding members as a unit for destroying said channel, means for moving other of said guiding members to operative positions for cooperating with said unitarily moved guiding members and thereafter moving said last named guiding members to inoperative positions, said moving means for said unitarily moved guiding members including a pair of oppositely acting solenoids having cores directly connected one to the other, means interconnecting said unitarily moved guiding members, a connection between said first named connection and said cores of said solenoids, a plurality of pairs of oppositely acting solenoids for moving said other film guiding members, and means for energizing each solenoid of each of said pairs in timed relation to the energization of the other solenoids.

35. In a film handling apparatus, in combination, a plurality of toothed feeding members disposed along the film path for operatively engaging the film, means operable for shielding said toothed feeding members from the film, means interconnecting certain of said shielding members for concomitantly moving them, means for moving said interconnected shielding members between operative positions and positions wherein they leave the associated film feeding members free to engage the film, and means for moving said connection between said toothed feeding members, said last named means including a pair of oppositely acting solenoids, cores for each of said solenoids, a connection between said cores, and a connection between one of said cores and said connecting means between said shielding means.

WARREN DUNHAM FOSTER.